ALEXANDER JOHNSON, OF BROCKPORT, NEW YORK.

Letters Patent No. 87,343, dated March 2, 1869.

IMPROVED MEDICAL COMPOUND.

The Schedule referred to in these Letters Patent and making part of the same.

*To all whom it may concern:*

Be it known that I, ALEXANDER JOHNSON, of Brockport, county of Monroe, and State of New York, have invented a new and useful Lotion for Sore and Inflamed Eyes; and I do hereby declare that the following is a full and exact description thereof.

The nature of my invention consists in a lotion for the cure of sore and inflamed eyes. It is perfectly harmless, and in no case does injury in the most delicate diseases of the eyes.

To enable others skilled in the art to make or use my invention, I will proceed to name the ingredients, and the proportions of the same to be used.

I use, of camphor-gum, one quarter of an ounce; white vitriol, one ounce; alum, one ounce; calomel, one-eighth of an ounce; Tilden's extract of opium, one-eighth of an ounce; the whole to be dissolved in one quart of clean rain-water.

In two weeks' time the lotion will be ready for use.

The application to the afflicted eye is made with a soft sponge.

I do not claim a "cure all the age," or a panacea, but simply a remedy for sore and inflamed eyes, from the simplest to the worst form of inflammation.

It safely and quickly cures all cases of ophthalmia, simple and prevalent, catarrhal, or gonorrhœal.

It immediately cleans up the worst cases of opacity of the cornea, granulation of the lids, *ireta tregium*, and, in fact, all the diseases of the eye, except nervous blindness and cataracts; and, in many of these cases, a decided benefit is received by its use.

My lotion is perfectly harmless, and in no case does injury in the most delicate diseases of the eye.

What I claim as my invention, and desire to secure by Letters Patent, is—

A remedy for sore or inflamed eyes, composed of, camphor-gum, one quarter ounce; white vitriol, one ounce; alum, one ounce; calomel, one-eighth of an ounce; Tilden's extract of opium, one-eighth of an ounce; the whole to be dissolved in one quart of clean rain-water, in the manner and for the purpose specified and described.

ALEXANDER JOHNSON.

Witnesses:
GEO. FRAUENBERGER,
GEO. EICHORN.